United States Patent
Ikeda et al.

(10) Patent No.: US 9,148,017 B2
(45) Date of Patent: Sep. 29, 2015

(54) POWER DEMAND MANAGEMENT APPARATUS AND POWER DEMAND MANAGEMENT SYSTEM

(71) Applicants: ENERES Co.,Ltd., Tokyo (JP); The Japan Research Institute, Limited, Tokyo (JP)

(72) Inventors: Motohide Ikeda, Tokyo (JP); Ken Watanabe, Tokyo (JP); Makoto Inoue, Kanagawa (JP)

(73) Assignees: ENERES Co., Ltd., Tokyo (JP); The Japan Research Institute, Limited, Tokyo (JP)

( * ) Notice: Subject to any disclaimer, the term of this patent is extended or adjusted under 35 U.S.C. 154(b) by 536 days.

(21) Appl. No.: 13/689,777

(22) Filed: Nov. 30, 2012

(65) Prior Publication Data

US 2013/0140893 A1 Jun. 6, 2013

Related U.S. Application Data

(63) Continuation of application No. PCT/JP2011/003012, filed on May 30, 2011.

(30) Foreign Application Priority Data

May 31, 2010 (JP) ................................. 2010-124749

(51) Int. Cl.
*H02J 3/14* (2006.01)
*H02J 3/00* (2006.01)
*G06Q 50/06* (2012.01)

(52) U.S. Cl.
CPC . *H02J 3/00* (2013.01); *G06Q 50/06* (2013.01); *H02J 3/14* (2013.01); *H02J 2003/003* (2013.01); *Y02B 70/3225* (2013.01); *Y02E 40/76* (2013.01); *Y04S 10/54* (2013.01); *Y04S 10/545* (2013.01); *Y04S 20/222* (2013.01); *Y10T 307/438* (2015.04)

(58) Field of Classification Search
USPC ............................................................ 307/32
See application file for complete search history.

(56) References Cited

FOREIGN PATENT DOCUMENTS

| JP | 2002-345177 A | 11/2002 |
| JP | 2008-295193 A | 12/2008 |
| JP | 2009-142023 A | 6/2009 |

OTHER PUBLICATIONS

International Search Report for International Application No. PCT/JP2011/003012 with Date of mailing of Sep. 6, 2011.
Translation of International Preliminary Report on Patentability for Application No. PCT/JP2011/003012 issued on Jan. 8, 2013.

*Primary Examiner* — Robert Deberadinis (57) ABSTRACT

A power demand management apparatus comprising a power demand acquiring section acquiring a predicted power demand; a consumer house information holding section that, for each of a plurality of request methods or request conditions, and for each of a plurality of consumer houses, holds a sensitivity indicating a probability that the consumer house will comply with a request; a consumer house selecting section that, when the predicted power demand exceeds a target value, selects a first consumer house whose sensitivity for a first request method or request condition is no less than a first reference value and selects a second consumer house whose sensitivity for a second request method or request condition is no less than a second reference value; and a restriction requesting section that issues requests for power demand restriction to the first and second consumer houses respectively using the first and second request methods or request conditions.

19 Claims, 6 Drawing Sheets

| 12 HOURS BEFORE RESTRICTION EXECUTION TIME REWARD MONEY:10 YEN | |
|---|---|
| CONSUMER HOUSE NAME | SENSITIVITY |
| CONSUMER HOUSE A | 30 |
| CONSUMER HOUSE B | 50 |
| CONSUMER HOUSE C | 65 |
| CONSUMER HOUSE D | 30 |
| CONSUMER HOUSE E | 80 |
| CONSUMER HOUSE F | 90 |

FIG. 3A

| 6 HOURS BEFORE RESTRICTION EXECUTION TIME REWARD MONEY:20 YEN | |
|---|---|
| CONSUMER HOUSE NAME | SENSITIVITY |
| CONSUMER HOUSE A | 50 |
| CONSUMER HOUSE B | 30 |
| CONSUMER HOUSE C | 80 |
| CONSUMER HOUSE D | 30 |
| CONSUMER HOUSE E | 50 |
| CONSUMER HOUSE F | 30 |

FIG. 3B

| 1 HOUR BEFORE RESTRICTION EXECUTION TIME REWARD MONEY:30 YEN | |
|---|---|
| CONSUMER HOUSE NAME | SENSITIVITY |
| CONSUMER HOUSE A | 90 |
| CONSUMER HOUSE B | 90 |
| CONSUMER HOUSE C | 30 |
| CONSUMER HOUSE D | 10 |
| CONSUMER HOUSE E | 70 |
| CONSUMER HOUSE F | 40 |

FIG. 3C

| CONSUMER HOUSE NAME | RESPONSE RESULT | REQUEST CONDITIONS |
|---|---|---|
| CONSUMER HOUSE A | PERMITTED | REWARD MONEY:30 YEN |
| CONSUMER HOUSE B | — | |
| CONSUMER HOUSE C | PERMITTED | REWARD MONEY:20 YEN |
| CONSUMER HOUSE D | — | |
| CONSUMER HOUSE E | PERMITTED | REWARD MONEY:10 YEN |
| CONSUMER HOUSE F | — | |

POWER DEMAND MANAGEMENT APPARATUS AND POWER DEMAND MANAGEMENT SYSTEM

The contents of the following Japanese patent application are incorporated herein by reference:
NO. 2010-124749 filed on May 31, 2010.

BACKGROUND

1. Technical Field

The present invention relates to a power demand management apparatus and a power demand management system that manage power demand of a consumer house.

2. Related Art

Citation 1 describes a system that, when the power consumption in a certain geographical region exceeds a prescribed reference value, broadcasts a power conservation request to consumer houses in this region. Citation 2 discloses a system that, based on actual data concerning the compliance of each device in a consumer house with a request for power demand restriction, predicts whether each device in the consumer house will comply with such requests in the future.

Patent Document 1: Japanese Patent Application Publication No. 2002-345177
Patent Document 2: Japanese Patent Application Publication No. 2009-142023

However, there are cases in which a company such as a specified power supplier uses a grid system of a general power supplier, and supplies power to consumer houses under contract from an owned or contracted power supply. Such companies predict the power demand during certain periods in the future, and purchase in advance power for these periods in order to fulfill the predicted power demands.

In recent years, in consideration of reducing carbon dioxide, for example, there are cases where it is undesirable to purchase in advance enough power to fulfill the predicted power demand and then provide this power to the consumer houses.

Therefore, the present invention provides a power demand management apparatus and a power demand management system that realize energy conservation.

SUMMARY

According to one aspect of the present invention, provided is a power demand management apparatus comprising a power demand acquiring section that acquires a predicted power demand, which is a power demand predicted for a predetermined period in the future; a consumer house information holding section that, for each of a plurality of request methods or request conditions for requesting that a consumer house restrict power demand, and for each of a plurality of the consumer houses, holds a sensitivity that indicates a probability that the consumer house will comply with a request when the request is issued to the consumer house with the corresponding request method or request condition; a consumer house selecting section that, when the predicted power demand exceeds a predetermined target value, selects a first consumer house whose sensitivity with respect to a first request method or request condition is greater than or equal to a first reference value and selects a second consumer house whose sensitivity with respect to a second request method or request condition is greater than or equal to a second reference value; and a restriction requesting section that issues a request for power demand restriction to the first consumer house using the first request method or request condition, and issues a request for power demand restriction to the second consumer house using the second request method or request condition.

In the power demand management apparatus described above, the power demand acquiring section may acquire a new power supply demand that is updated based on the result responses predicted based on the sensitivity of the first consumer house and the second consumer house with respect to the power demand request, and the request selecting section may handle the selection of the request method or request condition again when the new predicted power demand exceeds the target value.

In the power demand management apparatus described above, the request method may include a request time at which the restriction requesting section issues the request for power demand restriction, and the consumer house information holding section may hold, for each consumer house, the sensitivity at each request time.

In the power demand management apparatus described above, the request condition may include rewards provided to the consumer house if the consumer house permits the power demand restriction, and the consumer house information holding section may hold, for each consumer house, a sensitivity for each type of reward.

In the power demand management apparatus described above, the request condition may include an environmental condition that is predicted for a time period in which the restriction requesting section requests the power demand restriction, and the consumer house information holding section may hold, for each consumer house, a sensitivity for each environmental condition.

The power demand management apparatus described above may further comprise a response result holding section that holds response results from the first consumer house and the second consumer house issued in response to the request for power demand restriction, and a restriction instructing section that transmits power restriction instructions to the consumer houses that have complied with the request, based on the response results.

In the power demand management apparatus described above, the consumer house information holding section may hold, for each consumer house, a request time at which the restriction requesting section requests the power demand restriction in association with a reward amount to be provided to the consumer house if the consumer house permits the power demand restriction, and the reward amount may be higher when the request time is closer to a transmission time at which the power restriction instructions are transmitted.

According to an aspect of the present invention, provided is a power demand management system comprising the power demand management apparatus; and a robot that performs power restriction on electrical devices used by the consumer houses, in response to receiving power restriction instructions.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
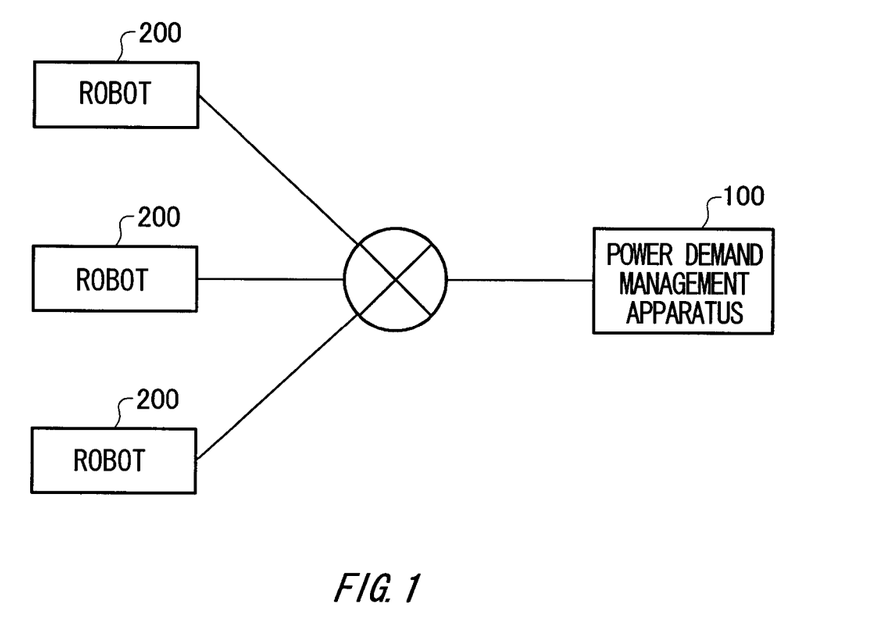
FIG. 1 shows an overall configuration of a power demand management system according to an embodiment of the present invention.

FIG. 1 shows an overall configuration of a power demand management system according to an embodiment of the present invention. The power demand management system includes a power demand management apparatus 100 and robots 200. The power demand management apparatus 100 and the robots 200 communicate with each other through a network. The power demand management apparatus 100 transmits power restriction instructions to the robots 200 corresponding to consumer houses that have previously permitted power demand restriction, in order to restrict the power demand.

The robots 200 are arranged in the rooms of the consumer houses. In response to receiving power restriction instructions, the robots 200 move within the houses and perform power restriction on the devices within the rooms. The devices may be electrical devices that consume power, such as lighting apparatuses, air conditioners, and televisions, for example. The devices are supplied with power from a commercial power supply. The devices each include an infrared light receiving section and a switch. Each robot 200 includes an arm mechanism, and may turn OFF the power supplies of the devices by using the arm mechanism to turn OFF the switch according to the power restriction instructions, thereby restricting the power demand. Each robot 200 includes an infrared transmitting section, and may turn OFF the power supplies of the devices by using the infrared transmitting section to transmit OFF commands to the devices according to the power restriction instructions, thereby restricting the power demand. Each robot 200 may restrict the power demand by adjusting the brightness of a lighting apparatus via the infrared light receiving section or the switch, according to the power restriction instructions. Each robot 200 may restrict the power demand by adjusting the temperature set for an air conditioner via the infrared light receiving section or the switch, according to the power restriction instructions.

Figure 2:
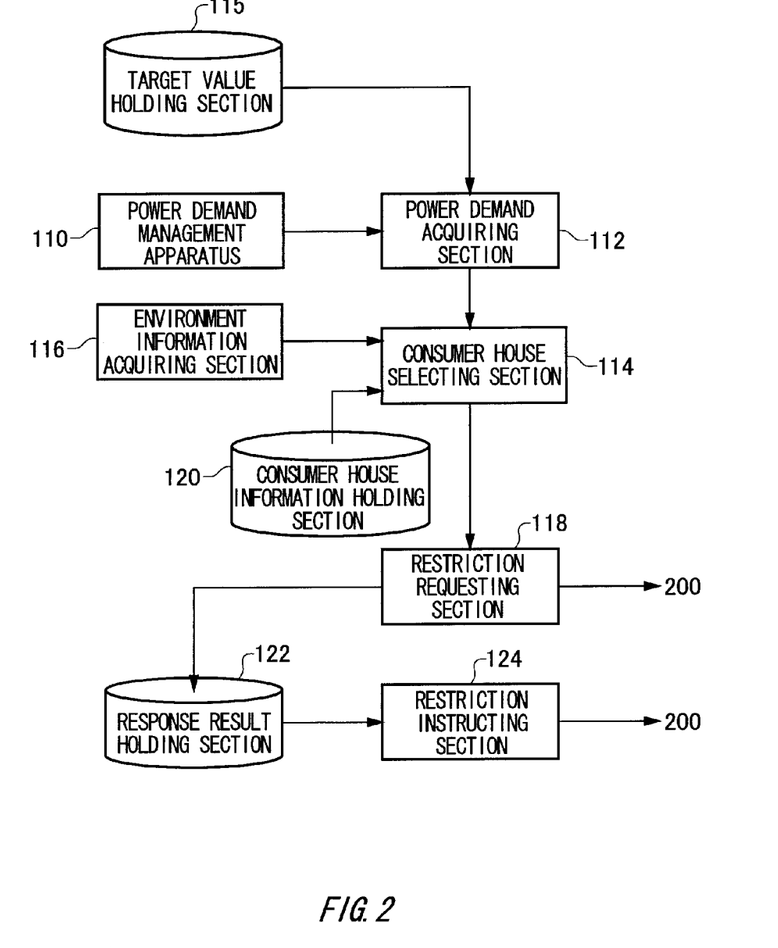
FIG. 2 shows function blocks of the power demand management apparatus.

FIG. 2 shows function blocks of the power demand management apparatus 100. A power demand predicting section 110 predicts, as a predicted power demand, the power demand occurring during a predetermined prediction period in the future, e.g. the next day or 30 minutes later, based on past power demand and expected environmental conditions, for example. The power demand may be a power value for 30-minute units during the following day, for example. A power demand acquiring section 112 acquires the predicted power demand from the power demand predicting section 110 and acquires a target value held by a target value holding section 115. For the predicted power value during a specified time period among the time periods acquired as the predicted power demand, e.g. when the predicted power value of a time period during which the power demand is at a peak, the power demand acquiring section 112 may calculate the target value to be a value obtained by reducing the amount of power by 30%, for example. The power demand acquiring section 112 determines whether the predicted power demand exceeds the target value, and provides the results of this determination to the consumer house selecting section 114. The power demand acquiring section 112 may compare the predicted power value at each time period acquired as the predicted power demand to the target power value for the time period, and determine whether the predicted power demand exceeds the target value by determining whether there is a time period in which the predicted power value exceeds the target power value.

For each request condition or request method used to request a restriction of the power demand, the consumer house information holding section 120 holds, for each consumer house, a sensitivity indicating the probability that the consumer house will comply with the request when a request is made to the consumer house with the corresponding request condition or request method. The consumer house information holding section 120 may hold the sensitivity of each consumer house in association with the request methods and request conditions. Here, the request method may include a request time at which a request for restriction is made to the consumer house. Furthermore, the request method may include a communication method for requesting restriction for a consumer house, such as phone, FAX, or e-mail. The request conditions may include content of a reward provided when a consumer house complies with the request, such as reward money or a type of product. Depending on the consumer house, there may be cases where the probability of complying with a request, i.e. the sensitivity, changes according to the reward amount, request time, or communication method, for example. Therefore, in the present embodiment, the sensitivity for each request method and request condition is held in association with each consumer house. Furthermore, consumer house information may indicate the sensitivity in association with environmental conditions such as temperature, weather, and season. For example, the consumer house information holding section 120 may hold consumer house information indicating the sensitivity of each consumer house for each combination of a request time, a reward amount, and a season. The power demand management apparatus 100 may update the sensitivity of each consumer house based on the history of the request response results for the consumer house.

When the predicted power demand exceeds the target value, in order to perform an adjustment causing the predicted power demand to drop below the target value, the consumer house selecting section 114 references the consumer house information holding section 120 and selects a plurality of request methods and/or request conditions. The request methods and request conditions to be selected may be held in advance by the consumer house selecting section 114. For example, the consumer house selecting section 114 may hold in advance a plurality of combinations in which request times are associated with reward amounts. The consumer house selecting section 114 may allow the user to designate request methods and request conditions on a case by case basis. Furthermore, the consumer house selecting section 114 may hold these combinations in which request times and reward amounts are associated for each environmental condition. In this case, the consumer house selecting section 114 may select combinations of associated request times and reward amounts that correspond to the environmental conditions, e.g. season or temperature, indicated by the environmental information supplied from an environmental information acquiring section 116, which is described further below. The consumer house selecting section 114 identifies the sensitivity of each consumer house corresponding to the selected combinations of request methods and request conditions, by referencing the consumer house information holding section 120. For each combination of a request method and a request condition, the consumer house selecting section 114 selects the optimal consumer house to adjust the predicted power demand to drop below the target value, based on the sensitivity of each identified consumer house. For example, the consumer house selecting section 114 may adjust the predicted power demand to be no greater than the target value by selecting, for each combination of a request method and a request condition, a consumer house whose sensitivity is greater than or equal to a predetermined reference value. The consumer house selecting section 114 may hold a reference value for each amount of power reduction required for the predicted power demand to become less than or equal to the target value, for example. In this case, the consumer house selecting section 114 may identify the reference value corresponding to a power reduction amount calculated based on the predicted power demand and the target value, and select a consumer house that has a sensitivity greater than or equal to the identified reference value, for each combination of a request method and a request condition. After selecting a consumer house that is a target of the request for each combination of a request method and a request condition and that causes the predicted power demand to drop below the target value, the consumer house selecting section 114 may provide the restriction requesting section 118 with request information indicating the consumer house that is a target of the request for each combination of a request method and a request condition.

The environmental information acquiring section 116 acquires the environmental information concerning the temperature and humidity, for example, during a prediction period, and provides this information to the consumer house selecting section 114. For example, the environmental information acquiring section 116 may acquire the environmental information via a network such as the Internet. The restriction requesting section 118 transmits the request information indicating a request for power restriction to the consumer house selected by the consumer house selecting section 114. The restriction requesting section 118 may transmit the request information via the robot 200 arranged within a room in the selected consumer house or via a portable terminal held in the selected consumer house. The request information may indicate a restriction execution time at which the power demand restriction is to be performed and reward money to be provided when the power restriction is permitted. Furthermore, the restriction requesting section 118 acquires a response result from the consumer house to which a request was issued, via the robot 200 or the portable terminal, and registers the response result in the response result holding section 122. The restriction instructing section 124 references the response result holding section 122 and transmits power restriction instructions to the consumer house based on the request method and request condition permitted by the consumer house. The restriction instructing section 124 may transmit the power restriction instructions to the robot 200 corresponding to the consumer house that has granted permission.

Figure 3A:
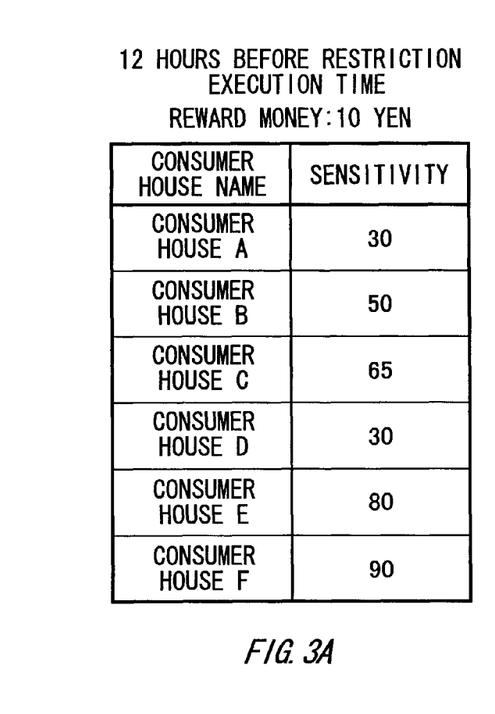
FIG. 3A shows consumer house information concerning the sensitivity of each consumer house when the reward amount is 10 yen and the request time is 12 hours before the restriction execution time.
Figure 3B:
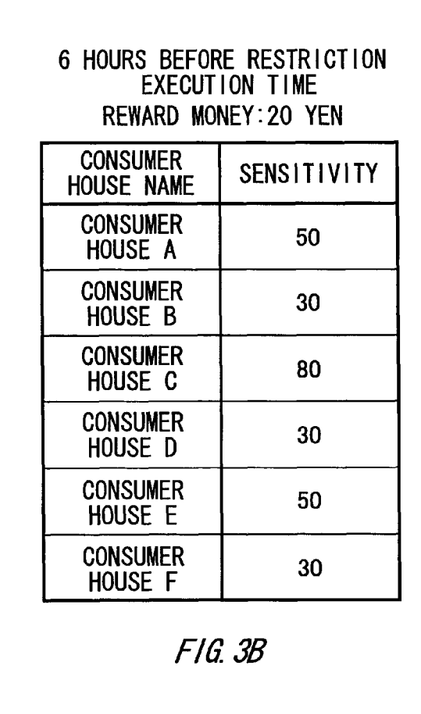
FIG. 3B shows consumer house information concerning the sensitivity of each consumer house when the reward amount is 20 yen and the request time is 6 hours before the restriction execution time.
Figure 3C:
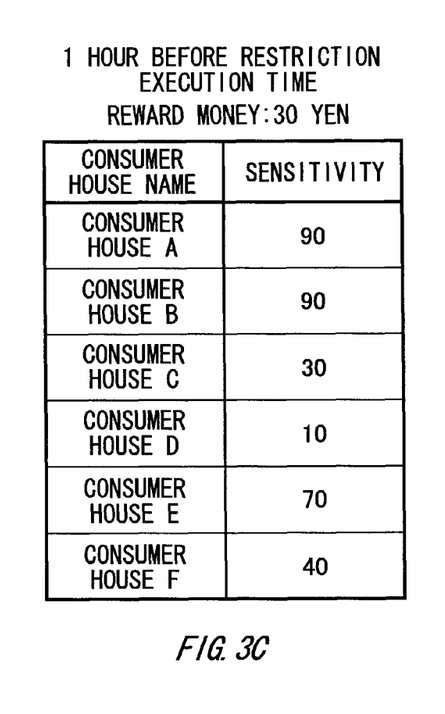
FIG. 3C shows consumer house information concerning the sensitivity of each consumer house when the reward amount is 30 yen and the request time is 1 hour before the restriction execution time.

FIGS. 3A to 3C shows exemplary consumer house information held by the consumer house information holding section 120. The consumer house information shows the sensitivity of for each consumer house in association with request time as the request method and reward amount as the request condition, for example. The consumer house information of FIG. 3A shows the sensitivity of each consumer house when the reward amount is 10 yen and the request time is 12 hours before the restriction execution time. The consumer house information of FIG. 3B shows the sensitivity of each consumer house when the reward amount is 20 yen and the request time is 6 hours before the restriction execution time. The consumer house information of FIG. 3C shows the sensitivity of each consumer house when the reward amount is 30 yen and the request time is 1 hour before the restriction execution time.

The restriction execution time may be a time that is a predetermined amount of time before the predicted time at which the predicted power demand, which was predicted prior to the power restriction request being issued, exceeds the target value. Furthermore, the reward amount may be higher when the request time is closer to the restriction execution time. In this way, a company such as the specified power supplier can minimize the reward money that must be provided to the consumer house and can decrease the increase in cost caused by buying more power to compensate for a lack of power due to the predicted power demand exceeding the target value, for example. In other words, when there is a relatively large amount of time until the restriction execution time, a small amount of reward money is offered to the consumer houses, in order to find a consumer house that will permit the restriction for this amount of reward money. As a result, the reward money that must be provided to the consumer house is kept low. In addition, even at a time immediately before the restriction execution time, if the predicted power demand still exceeds the target value, the consumer houses are offered a reward amount that is greater than the previously offered reward amount but less than the cost of purchasing the necessary power to compensate for the lack of power, and therefore it is more likely that a consumer house will grant permission. In this way, a new purchase of power to compensate for the insufficient power due to the actual power demand exceeding the target value can be prevented.

The consumer house selecting section 114 references the consumer house information shown in FIGS. 3A to 3C, compares the sensitivity of each consumer house to a predetermined reference value, and selects a consumer house whose sensitivity is greater than the reference value for each request method and request condition or for each combination of a request method and a request condition. The reference value may be a different value for each request method and request condition or for each combination of a request method and a request condition.

Figure 4:
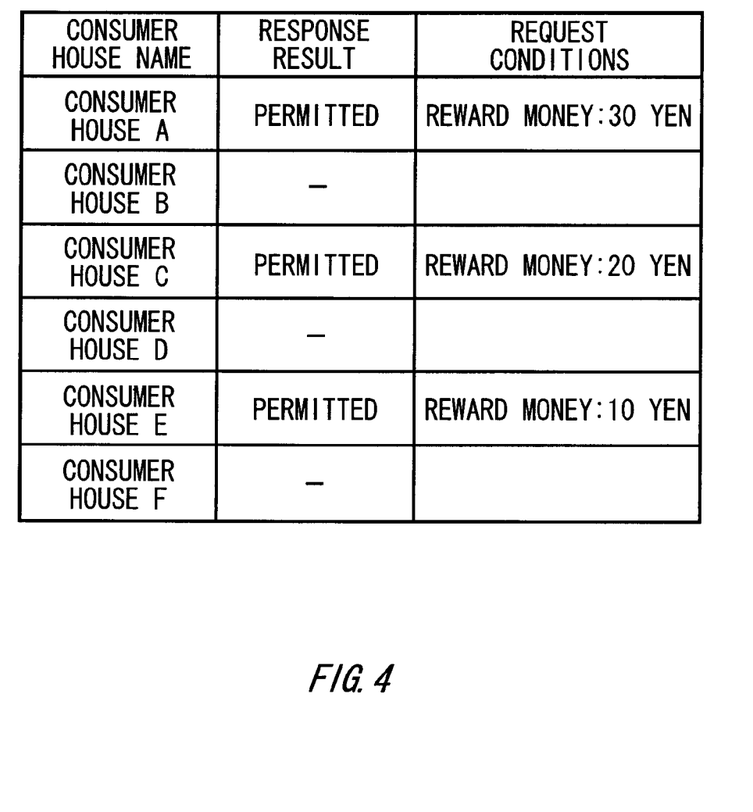
FIG. 4 shows exemplary response result information held by the response result holding section.

FIG. 4 shows exemplary response result information held by the response result holding section 122. The response result information indicates the result of a response concerning under which request conditions a consumer house has complied with the request, for each consumer house. For example, the response result holding section 122 hold response result information indicating which consumer houses have complied with a request for what amount of reward money. The restriction instructing section 124 references the response result information such as shown in FIG. 4 and transmits power restriction instructions to a consumer house that has granted permission, at a predetermined restriction execution time.

In the manner described above, the power demand management apparatus 100 sets the reward money in advance for each of a plurality of request times spanning up to the restriction execution time. Based on the sensitivity of each consumer house when presented with a request at each request time and with each amount of reward money, the power demand management apparatus 100 selects the consumer house to which a request will be issued at each request time in order to cause the predicted power demand to be less than or equal to the target value. Here, the power demand corresponding to the target value takes into consideration the amount of power reduction resulting from the restriction permitted by the consumer houses. Therefore, by purchasing power based on the predicted power demand that takes into consideration the reduced power consumption, a company such as the specified power supplier can reduced the power that is purchased in advance, thereby conserving energy.

Figure 5:
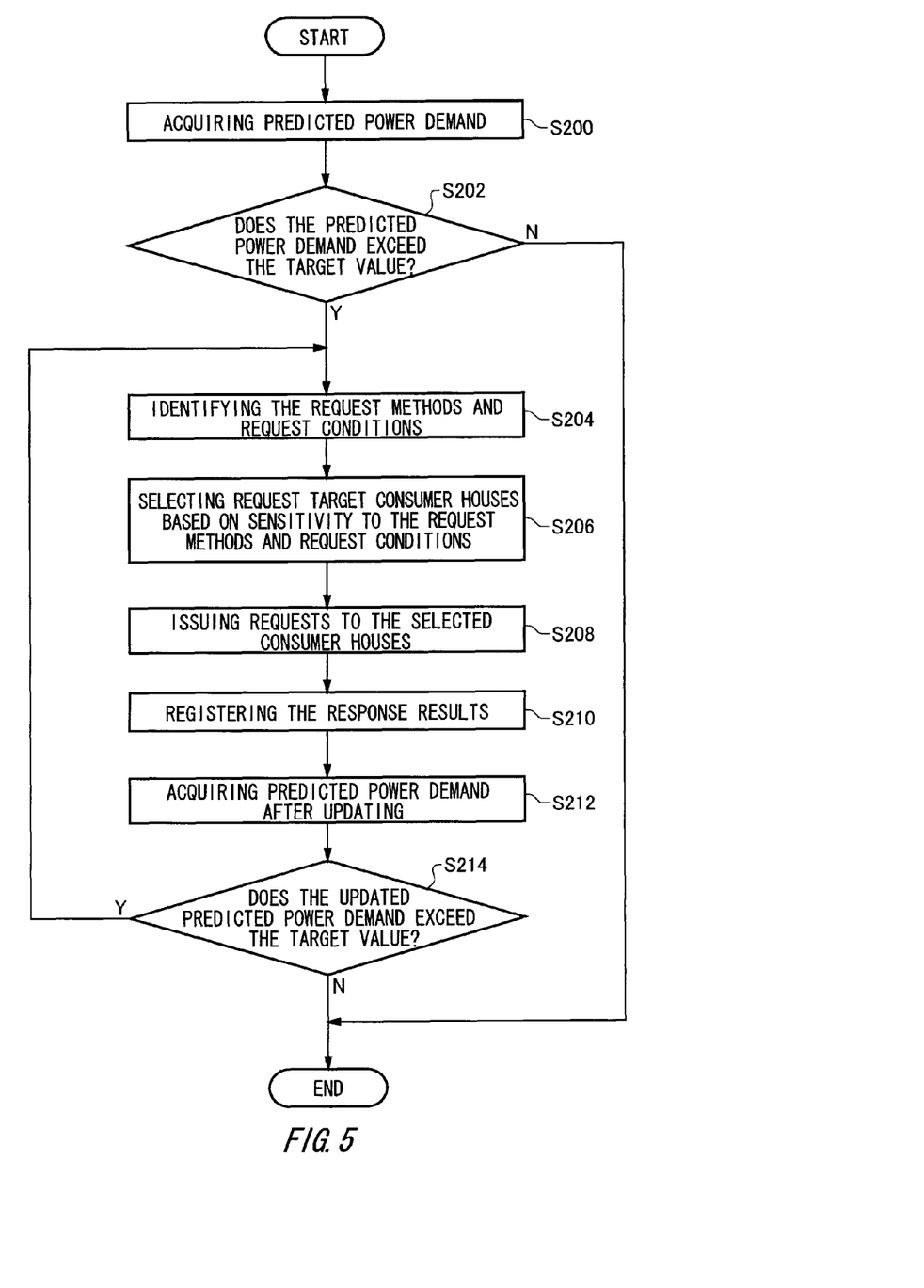
FIG. 5 is a flow chart showing an exemplary process by which the power demand management apparatus issues a power demand restriction request to a consumer house.

FIG. 5 is a flow chart showing an exemplary process by which the power demand management apparatus 100 issues a power demand restriction request to a consumer house.

The power demand acquiring section 112 acquires the predicted power demand for 30 minutes after the current time, from the power demand predicting section 110 (S200). The power demand acquiring section 112 acquires the target value held by the target value holding section 115 and determines whether the predicted power demand exceeds the target value (S202). If the result of this determination indicates that the predicted power demand does not exceed the target value, the process is ended.

On the other hand, if the predicted power demand exceeds the target value, the consumer house selecting section 114 identifies a request method and a request condition (S204). The consumer house selecting section 114 may hold in advance a plurality of combinations, which are set in advance and intended for execution, in which the reward money and request time are associated, and may identify the earliest request time that is after the current time and a reward amount corresponding to this request time. Next, the consumer house selecting section 114 references the consumer house information corresponding to the identified request method and request condition, and selects the consumer houses having sensitivity that is 70% or more, for example, of the reference value set in advance for the identified request method and request condition (S206). The restriction requesting section 118 then issues a request for power demand restriction to each of the selected consumer houses, at the request time indicated by the identified request method (S208).

Next, according to the response results from each of the consumer houses, the restriction requesting section 118 registers the response results of the consumer houses in the response result holding section 122 (S210). The power demand predicting section 110 predicts a new predicted power demand based on the response results of the consumer houses. For example, the power demand predicting section 110 may hold in advance, as the power reduction amount of each consumer house, the amount of power reduction that would result from the consumer houses permitting the restriction. In this case, the power demand predicting section 110 references the response results, identifies the power reduction amounts of the consumer houses that have granted permission, and updates the predicted power demand based on the identified power reduction amounts. The power demand acquiring section 112 acquires the predicted power demand after the update (S212), and determines whether the updated predicted power demand exceeds the target value (S214). Steps S204 to S214 are repeated until the result of this determination indicates that the updated predicted power demand does not exceed the target value.

In the manner described above, the power demand management apparatus 100 repeatedly issues the restriction request to selected consumer houses based on the sensitivity, until the restriction execution time has been reached. As a result, the power demand management apparatus 100 can control the power demand such that the predicted power demand does not exceed the target value corresponding to the power that has been purchased in advance, for example.

FIGS. 6A to 6D show change in the predicted power demand occurring when the power demand management apparatus 100 issues the power demand restriction request to consumer houses at each request time. The dotted lines 300 indicate the target value, and the solid lines 310 indicate the predicted power demand.

Figure 6A:
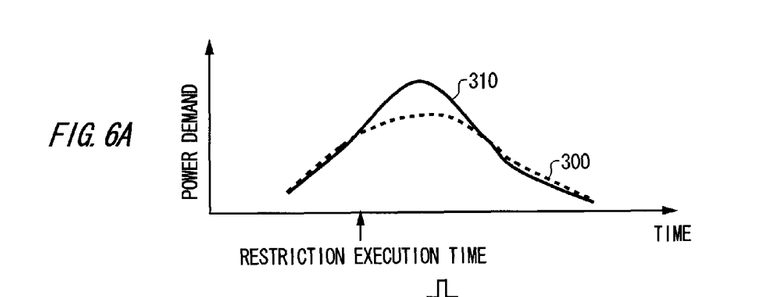
FIG. 6A shows the target value and predicted power demand at a time when the power demand predicting section predicts the power demand for the next day.
Figure 6B:
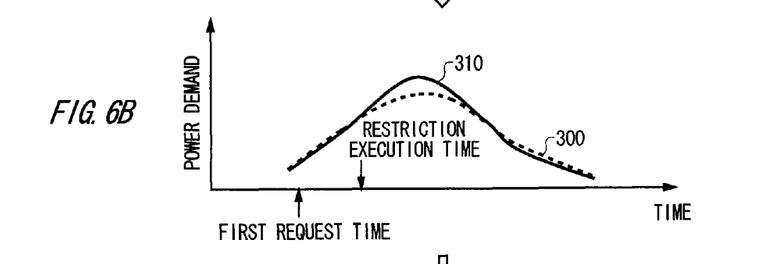
FIG. 6B shows the predicted power demand when a restriction request is issued to the consumer houses having sensitivity greater than or equal to the reference value at a first request time, e.g. 12 hours before the restriction execution time.
Figure 6C:
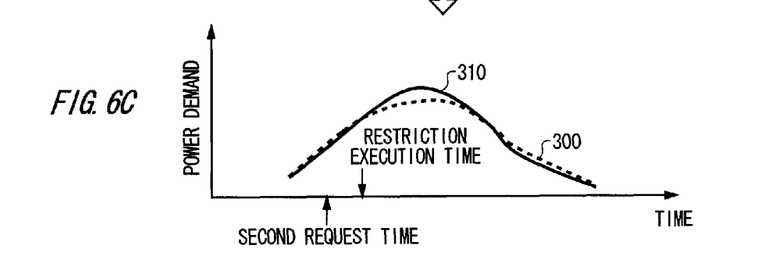
FIG. 6C shows the predicted power demand when a restriction request is issued to the consumer houses having sensitivity greater than or equal to the reference value at a second request time, e.g. 6 hours before the restriction execution time.
Figure 6D:
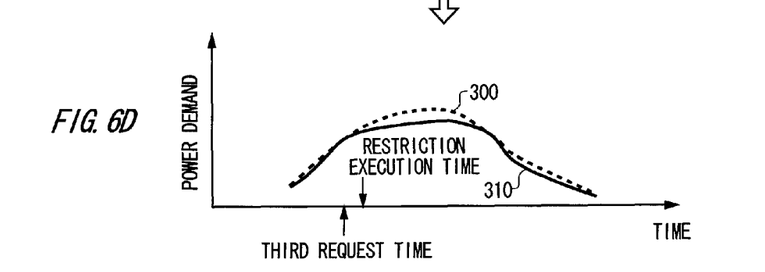
FIG. 6D shows the predicted power demand when a restriction request is issued to the consumer houses having sensitivity greater than or equal to the reference value at a third request time, e.g. 1 hour before the restriction execution time.

FIG. 6A shows the target value and predicted power demand at a time when the power demand predicting section 110 predicts the power demand for the next day. FIG. 6B shows the predicted power demand when a restriction request is issued to the consumer houses having sensitivity greater than or equal to the reference value at a first request time, e.g. 12 hours before the restriction execution time. FIG. 6C shows the predicted power demand when a restriction request is issued to the consumer houses having sensitivity greater than or equal to the reference value at a second request time, e.g. 6 hours before the restriction execution time. FIG. 6D shows the predicted power demand when a restriction request is issued to the consumer houses having sensitivity greater than or equal to the reference value at a third request time, e.g. 1 hour before the restriction execution time.

As described above, in the present embodiment, based on the sensitivity of the consumer houses when requests are issued using each of the request methods and request conditions, the power demand management apparatus 100 selects the consumer houses to which a request will be issued at each request time in order to cause the predicted power demand to be less than or equal to the target value, thereby reducing the predicted power demand to the target value. In this way, by purchasing power based on the predicted power demand that takes into consideration the reduced power amount resulting from the power demand restriction, a company such as the specified power supplier can reduce the power that is purchased in advance, thereby conserving energy.

In the present embodiment, the power demand management apparatus 100 repeatedly issues the restriction request to the selected consumer houses based on the sensitivity, until the restriction execution time is reached. In this way, the power demand management apparatus 100 can control the power demand such that the predicted power demand does not exceed the target value corresponding to the power that has been purchased in advance, for example.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A power demand management apparatus comprising:
a power demand acquiring section that acquires a predicted power demand, which is a power demand predicted for a predetermined period in the future;
a consumer house information holding section that, for each of a plurality of request methods or request conditions for requesting that a consumer house restrict power demand, and for each of a plurality of the consumer houses, holds a sensitivity that indicates a probability that the consumer house will comply with a request when the request is issued to the consumer house with the corresponding request method or request condition;
a consumer house selecting section that, when the predicted power demand exceeds a predetermined target value, selects a first consumer house whose sensitivity with respect to a first request method or request condition is greater than or equal to a first reference value and selects a second consumer house whose sensitivity with respect to a second request method or request condition is greater than or equal to a second reference value; and
a restriction requesting section that issues a request for power demand restriction to the first consumer house using the first request method or request condition, and issues a request for power demand restriction to the second consumer house using the second request method or request condition.

2. The power demand management apparatus according to claim 1, wherein
the request method includes a request time at which the restriction requesting section issues the request for power demand restriction, and
the consumer house information holding section holds, for each consumer house, the sensitivity at each request time.

3. The power demand management apparatus according to claim 2, wherein
the restriction requesting section transmits to the first consumer house, using the first request method, request information that requests, with the first request condition, the execution of the power demand restriction at a predetermined restriction execution time, and transmits to the second consumer house, using the second request method, request information that requests, with the second request condition, the execution of the power demand restriction at the restriction execution time.

4. The power demand management apparatus according to claim 1, wherein
the consumer house selecting section selects the first consumer house whose sensitivity with respect to the first request method or request condition is greater than or equal to the predetermined first reference value based on the amount of power reduction necessary to cause the predicted power demand to be less than or equal to the target value, and selects the second consumer house whose sensitivity with respect to the second request method or request condition is greater than or equal to the predetermined second reference value based on the amount of power reduction necessary to cause the predicted power demand to be less than or equal to the target value.

5. The power demand management apparatus according to claim 1, wherein
the request condition includes rewards provided to the consumer house if the consumer house permits the power demand restriction, and
the consumer house information holding section holds, for each consumer house, a sensitivity for each type of reward.

6. The power demand management apparatus according to claim 1, wherein
the request condition includes an environmental condition that is predicted for a time period in which the restriction requesting section requests the power demand restriction, and
the consumer house information holding section holds, for each consumer house, a sensitivity for each environmental condition.

7. The power demand management apparatus according to claim 1, wherein
the request condition includes communication methods for issuing the power demand restriction request to the consumer house, and
the consumer house information holding section holds, for each consumer house, a sensitivity for each communication method.

8. The power demand management apparatus according to claim 1, further comprising:
a response result holding section that holds response results from the first consumer house and the second consumer house issued in response to the request for power demand restriction, and
a restriction instructing section that transmits power restriction instructions to the consumer houses that have complied with the request, based on the response results.

9. The power demand management apparatus according to claim 8, wherein
the consumer house information holding section holds, for each consumer house, a request time at which the restriction requesting section requests the power demand restriction in association with a reward amount to be provided to the consumer house if the consumer house permits the power demand restriction, and
the reward amount is higher when the request time is closer to a transmission time at which the power restriction instructions are transmitted.

10. A power demand management system comprising:
a power demand management apparatus that includes:
a power demand acquiring section that acquires a predicted power demand, which is a power demand predicted for a predetermined period in the future;

a consumer house information holding section that, for each of a plurality of request methods or request conditions for requesting that a consumer house restrict power demand, and for each of a plurality of the consumer houses, holds a sensitivity that indicates a probability that the consumer house will comply with a request when the request is issued to the consumer house with the corresponding request method or request condition;

a consumer house selecting section that, when the predicted power demand exceeds a predetermined target value, selects a first consumer house whose sensitivity with respect to a first request method or request condition is greater than or equal to a first reference value and selects a second consumer house whose sensitivity with respect to a second request method or request condition is greater than or equal to a second reference value;

a restriction requesting section that issues a request for power demand restriction to the first consumer house using the first request method or request condition, and issues a request for power demand restriction to the second consumer house using the second request method or request condition;

a response result holding section that holds response results from the first consumer house and the second consumer house issued in response to the request for power demand restriction, and a restriction instructing section that transmits power restriction instructions to the consumer houses that have complied with the request, based on the response results; and a robot that performs power restriction on electrical devices used by the consumer houses, in response to receiving power restriction instructions.

11. The power demand management system according to claim 10, wherein
the robot includes an arm mechanism and, in response to receiving the power restriction instructions, performs power restriction by using the arm mechanism to turn OFF switches of the electrical devices.

12. The power demand management system according to claim 10, wherein
the robot includes an infrared transmitting section and, in response to receiving the power restriction instructions, performs power restriction by transmitting an OFF command toward infrared light receiving sections of the electrical devices, via the infrared transmitting section.

13. The power demand management system according to claim 10, wherein
the request method includes a request time at which the restriction requesting section issues the request for power demand restriction, and
the consumer house information holding section holds, for each consumer house, the sensitivity at each request time.

14. The power demand management system according to claim 13, wherein
the restriction requesting section transmits to the first consumer house, using the first request method, request information that requests, with the first request condition, the execution of the power demand restriction at a predetermined restriction execution time, and transmits to the second consumer house, using the second request method, request information that requests, with the second request condition, the execution of the power demand restriction at the restriction execution time.

15. The power demand management system according to claim 10, wherein
the consumer house selecting section selects the first consumer house whose sensitivity with respect to the first request method or request condition is greater than or equal to the predetermined first reference value based on the amount of power reduction necessary to cause the predicted power demand to be less than or equal to the target value, and selects the second consumer house whose sensitivity with respect to the second request method or request condition is greater than or equal to the predetermined second reference value based on the amount of power reduction necessary to cause the predicted power demand to be less than or equal to the target value.

16. The power demand management system according to claim 10, wherein
the request condition includes rewards provided to the consumer house if the consumer house permits the power demand restriction, and
the consumer house information holding section holds, for each consumer house, a sensitivity for each type of reward.

17. The power demand management apparatus according to claim 10, wherein
the request condition includes an environmental condition that is predicted for a time period in which the restriction requesting section requests the power demand restriction, and
the consumer house information holding section holds, for each consumer house, a sensitivity for each environmental condition.

18. The power demand management system according to claim 10, wherein
the request condition includes communication methods for issuing the power demand restriction request to the consumer house, and
the consumer house information holding section holds, for each consumer house, a sensitivity for each communication method.

19. The power demand management system according to claim 10, wherein
the consumer house information holding section holds, for each consumer house, a request time at which the restriction requesting section requests the power demand restriction in association with a reward amount to be provided to the consumer house if the consumer house permits the power demand restriction, and
the reward amount is higher when the request time is closer to a transmission time at which the power restriction instructions are transmitted.

* * * * *